Figure 1:
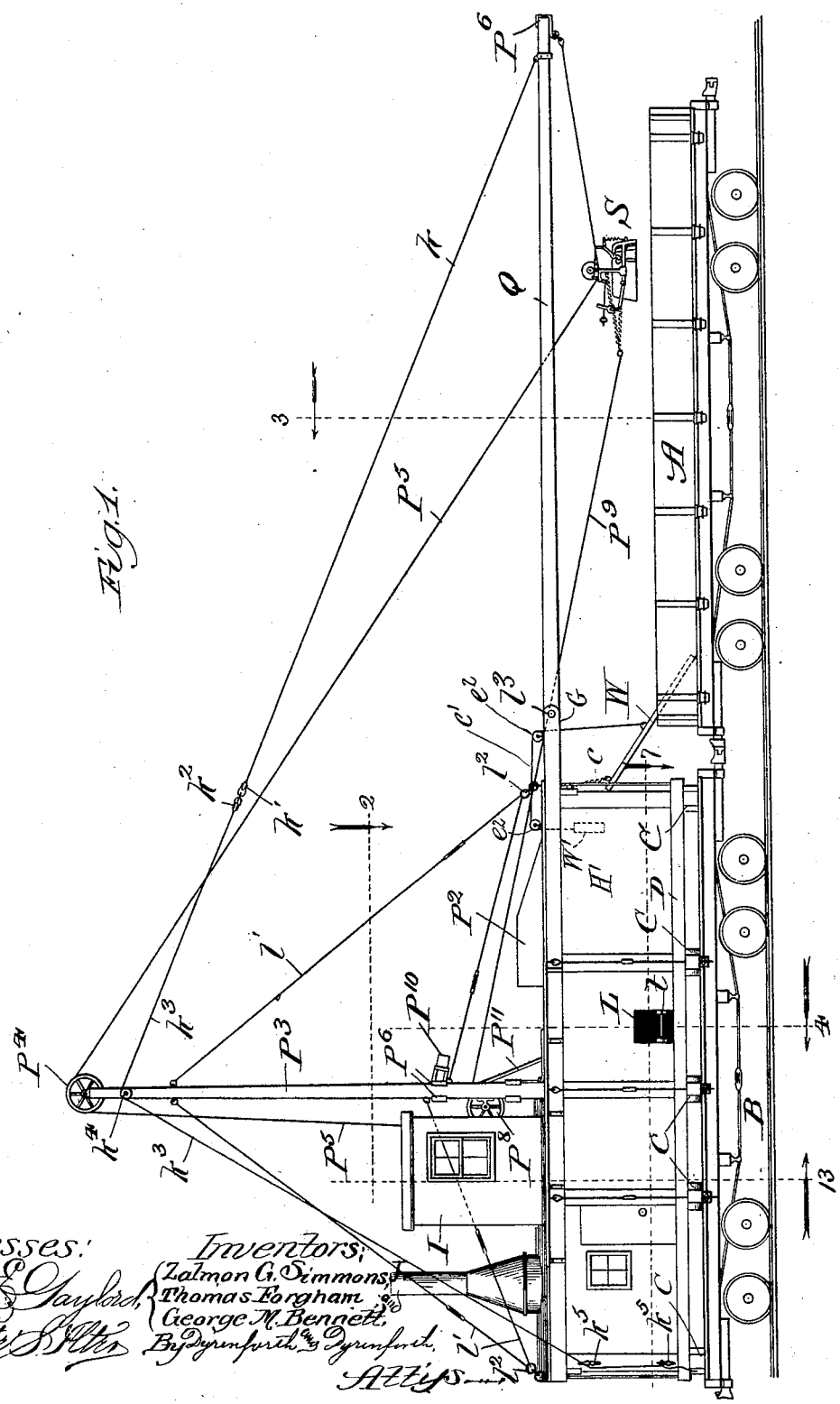

No. 633,348. Patented Sept. 19, 1899.
Z. G. SIMMONS, Jr., T. FORGHAM & G. M. BENNETT.
COAL UNLOADING AND DISTRIBUTING APPARATUS FOR USE IN BALLAST BURNING.
(Application filed Dec. 23, 1898.)
(No Model.) 8 Sheets—Sheet 1.

No. 633,348. Patented Sept. 19, 1899.
Z. G. SIMMONS, JR., T. FORGHAM & G. M. BENNETT.
COAL UNLOADING AND DISTRIBUTING APPARATUS FOR USE IN BALLAST BURNING.
(Application filed Dec. 23, 1898.)
(No Model.) 8 Sheets—Sheet 2.

No. 633,348. Patented Sept. 19, 1899.
Z. G. SIMMONS, Jr., T. FORGHAM & G. M. BENNETT.
COAL UNLOADING AND DISTRIBUTING APPARATUS FOR USE IN BALLAST BURNING.
(Application filed Dec. 23, 1898.)
(No Model.) 8 Sheets—Sheet 3.

Fig. 3.

Witnesses:
Chas. E. Gaylord,
Luth L. Smith

Inventors:
Zalmon G. Simmons, Jr.,
Thomas Forgham,
George M. Bennett,
By Dyrenforth & Dyrenforth,
Attys.

No. 633,348. Patented Sept. 19, 1899.
Z. G. SIMMONS, Jr., T. FORGHAM & G. M. BENNETT.
COAL UNLOADING AND DISTRIBUTING APPARATUS FOR USE IN BALLAST BURNING.
(Application filed Dec. 23, 1898.)
(No Model.) 8 Sheets—Sheet 4.
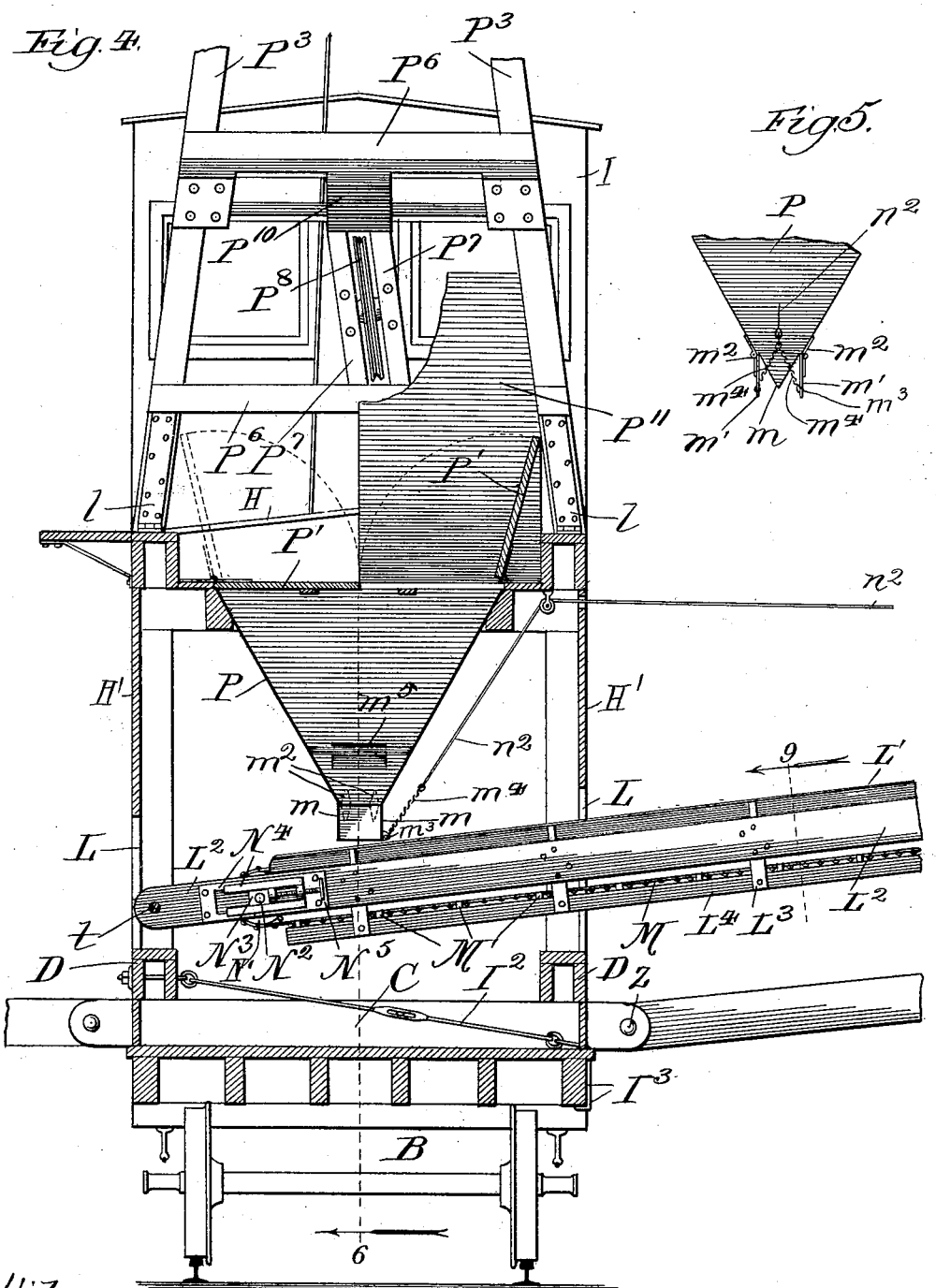
Witnesses:
Inventors.
Zalmon G. Simmons Jr.,
Thomas Forgham, and
George M. Bennett.

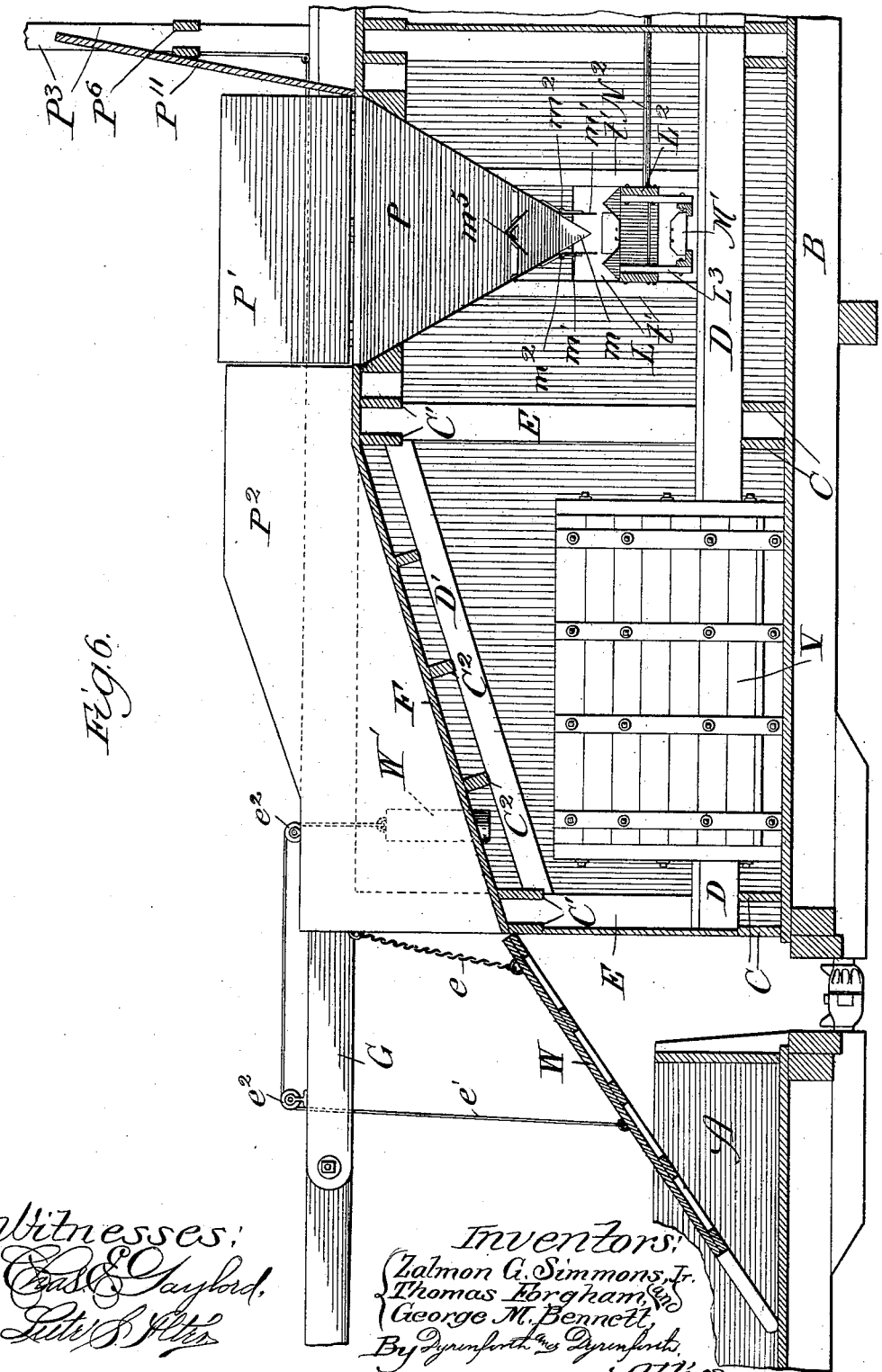

No. 633,348. Patented Sept. 19, 1899.
Z. G. SIMMONS, Jr., T. FORGHAM & G. M. BENNETT.
COAL UNLOADING AND DISTRIBUTING APPARATUS FOR USE IN BALLAST BURNING.
(Application filed Dec. 23, 1898.)
(No Model.) 8 Sheets—Sheet 6.
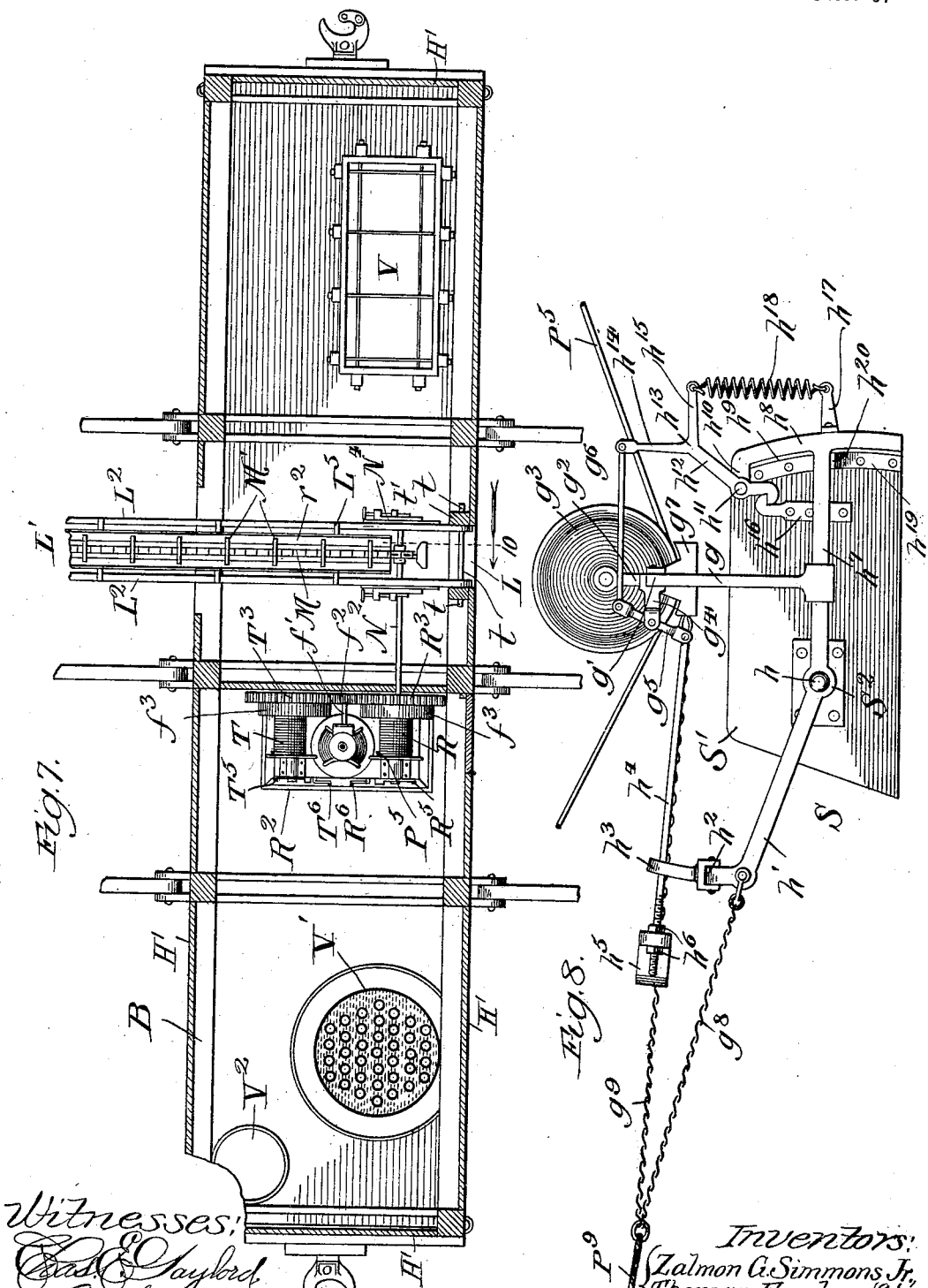

No. 633,348. Patented Sept. 19, 1899.
Z. G. SIMMONS, Jr., T. FORGHAM & G. M. BENNETT.
COAL UNLOADING AND DISTRIBUTING APPARATUS FOR USE IN BALLAST BURNING.
(Application filed Dec. 23, 1898.)
(No Model.) 8 Sheets—Sheet 7.
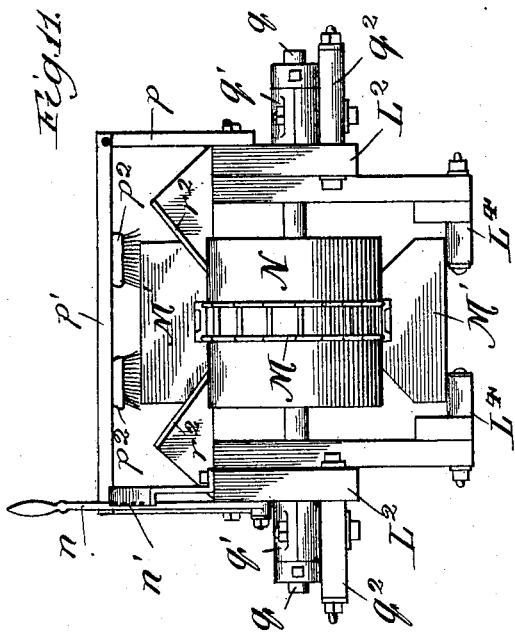
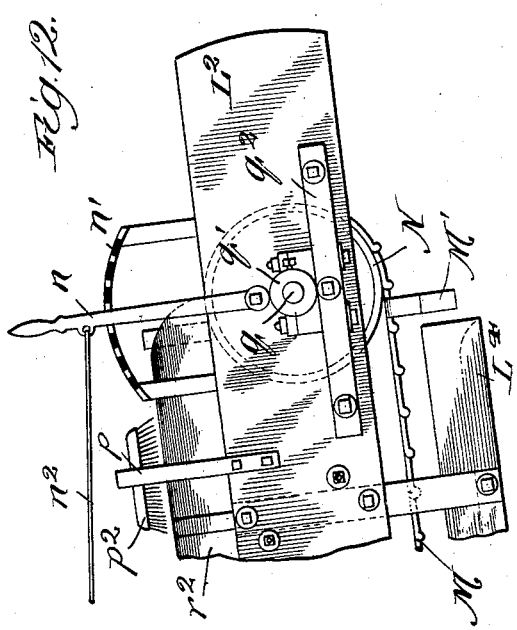
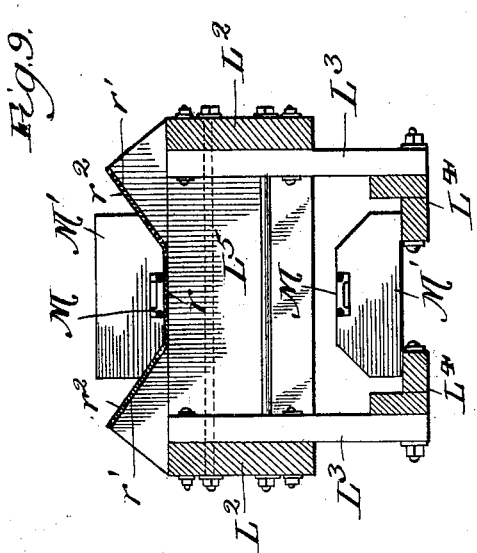
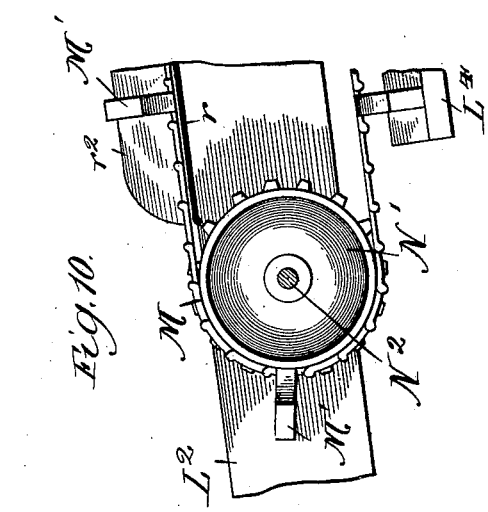
Witnesses:
Inventors:
Zalmon G. Simmons Jr.,
Thomas Forgham,
George M. Bennett,

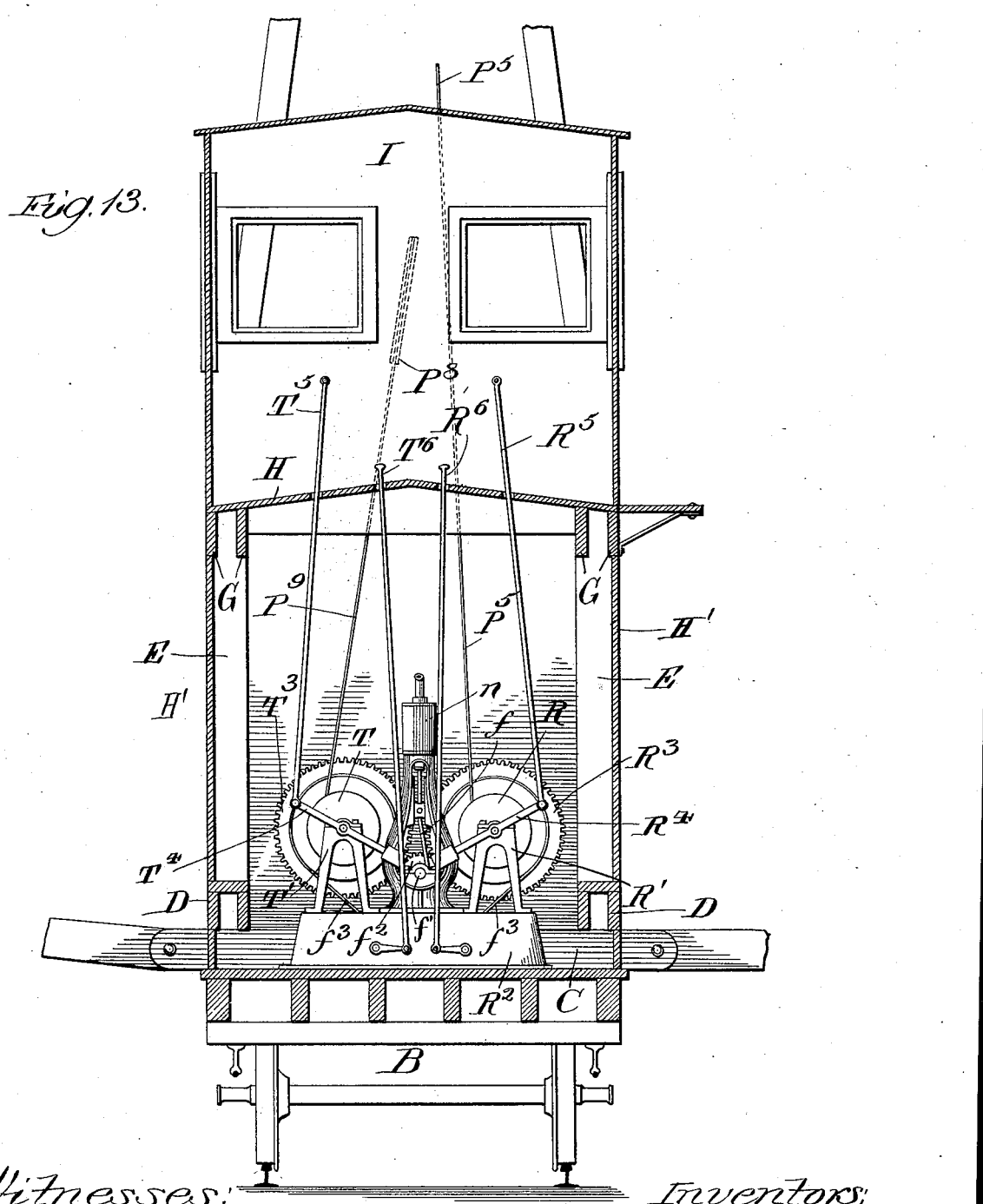

UNITED STATES PATENT OFFICE.

ZALMON G. SIMMONS, JR., THOMAS FORGHAM, AND GEORGE M. BENNETT, OF KENOSHA, WISCONSIN.

COAL UNLOADING AND DISTRIBUTING APPARATUS FOR USE IN BALLAST BURNING.

SPECIFICATION forming part of Letters Patent No. 633,348, dated September 19, 1899.

Application filed December 23, 1898. Serial No. 700,482. (No model.)

*To all whom it may concern:*

Be it known that we, ZALMON G. SIMMONS, Jr., a citizen of the United States, and THOMAS FORGHAM and GEORGE M. BENNETT, subjects of the Queen of Great Britain, residing at Kenosha, in the county of Kenosha and State of Wisconsin, have invented a new and useful Improvement in Coal Unloading and Distributing Apparatus for Use in Ballast Burning, of which the following is a specification.

Our invention is in the nature of an improvement in apparatus for unloading coal from a coal-car and delivering it to a laterally-supported platform carried by a car upon which are mounted the conveying mechanism and driving machinery, from whence the coal may be shoveled upon or mixed with clay to be burned in making ballast.

Generally stated, the invention consists in portable unloading and conveying mechanism preferably mounted upon a flat-car and operating to take the coal from the loaded car, transfer it to a suitable hopper upon said flat-car, and thence to convey it as needed in a direction at right angles to the car's length a certain distance, where it is dumped upon a platform flanking and attached to the flat-car and at the required distance therefrom, to be there taken by men standing upon the platform and shoveled as needed upon the ballast-pile to be burned.

While the primary object of our invention is to produce a ready means for supplying coal to a ballast-bank, it will be evident from the following description that it may be readily applied to the unloading and transferring of coal or the like material generally for various purposes.

The invention as applied to the purpose of ballast burning contemplates the placing of the car upon which is mounted the transferring mechanism, and which we term a "transferring-car," upon a track upon which is also placed a machine for digging the clay, and the use of these two machines for supplying to the ballast-bank in alternate layers coal and clay as it is needed. The ballast-bank is at one side of and at some distance from the track and the space between the bank and the track is that from which the clay is dug. The transferring-car, therefore, must be provided with a lateral conveyer of sufficient length to carry the coal over the ditch formed by the removal of the clay and deliver it to the platform, from whence it is shoveled upon the sloping side of the ballast-bank. After the clay has been dug close up to the track the latter is moved over a certain distance and the operation is repeated.

Figure 2:
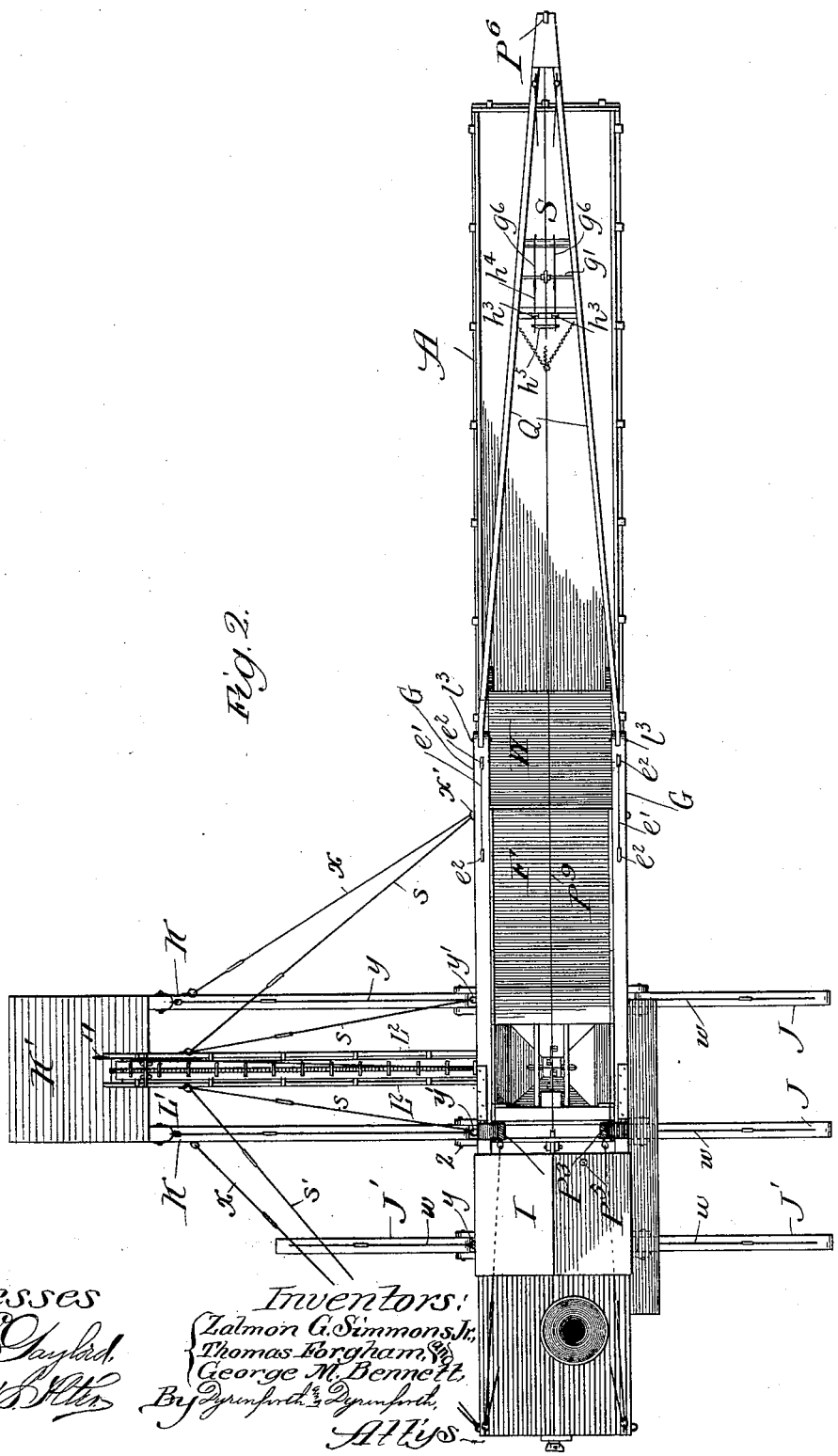

In the accompanying drawings, Figure 1 is a view in side elevation, of the side opposite that on which the coal is to be unloaded, of our coal unloading and distributing apparatus shown as mounted on a flat-car coupled to a coal-car. Figs. 2 and 7 are plan sections taken on lines 2 and 7, respectively, of Fig. 1, Fig. 7 being on an enlarged scale; Figs. 3, 4, and 13, vertical transverse sections taken on lines 3, 4, and 13, respectively, of Fig. 1; Fig. 5, a broken detail of the lower part of the hopper employed; Fig. 6, a broken vertical longitudinal section on line 6 of Fig. 4; Fig. 8, a detached view, in side elevation, of the shovel employed; Fig. 9, a section of the lateral conveyer employed, taken on line 9 of Fig. 4; Fig. 10, a broken sectional view of the same, taken near its lower or pivotal end; Fig. 11, a view in end elevation of the upper end thereof, and Fig. 12 a broken view, in side elevation, of the outer end of said lateral conveyer.

A is the coal-car, to which is coupled a transferring-car B, upon which is mounted the transferring and conveying mechanism and the platform to which the coal is delivered. To support the various movable parts, the transferring-car is supplied with a suitable framework, and this is built upon and secured to an ordinary flat-car, the whole being provided with suitable walls and covering to serve as a protection to the machinery.

Upon the flat-car at its two ends and intermediate thereof at equal distances apart (see Figs. 1 and 6) are placed sills or cross-ties C, five in number, preferably each comprising two heavy planks or light timbers separated by a short space. At the sides of the car and resting upon the cross-tie 5 C are longitudinally-extending stringers D, preferably in the form of inverted box-troughs made up of heavy planks. Supported by the stringers D immediately above the cross-ties are uprights E, connected toward their tops by joists C'. These joists are all at the same height except the one at what I shall term the "front end" of the transferring-car—that is, the end toward the coal-car. The joist at the front end is some distance below the others, and together with cross-timbers $C^2$, supported by inclined longitudinally-extending stringers D', joining the front end uprights to the next adjacent uprights, affords a support for a backwardly and upwardly inclined floor or chute F. Upon the upper ends of the uprights E are timbers G, which extend the full length of the car and project beyond the front end thereof. These timbers support the top H of the car-body, which also serves as the floor of the engineer's cabin I. Side and end walls H' complete the casing of the car-body. The whole is secured to the car-platform and braced in any suitable manner, a portion of the bracing being shown in the form of stay-rods $I^2$ and tie-straps $I^3$ in Fig. 4.

The three intermediate cross-ties C project beyond the sides of the car (see Figs. 2 and 3) and are supplied with pins $z$, upon which are pivoted the inner ends of ballast-supporting timbers J and J' and platform-supporting timbers K, carrying a platform K'. The timbers K are supported by tension members $y$, connected with rings $y'$, secured to the frame, and are held against lateral swaying by stay-rods $x$, secured to fastenings $x'$, with which the frame is equipped. The ballast-supporting timbers J J' are held by tension members $w$, connecting with rings $y'$.

The side walls of the car-body are provided centrally of their bottom portions with openings L, through one of which extends a lateral conveyer L', pivotally mounted upon a shaft $t$, secured to uprights $t'$ at the side of the car opposite that from which the conveyer projects. The conveyer L' is secured by tension members $s$ and stay-rods $s'$. The conveyer L' comprises two side pieces or planks $L^2$, pivoted at their lower ends upon the rod $t$ and extending the full length of the conveyer. These side pieces support at intervals of a few feet downward-projecting posts $L^3$, to whose lower ends are attached lower side strips and bottom pieces $L^4$, forming the return-path of the endless-chain conveyer. The posts $L^3$ are joined at their tops by cross-pieces $L^5$, Fig. 9, having their tops fashioned to afford a flat surface $r$ and inclined surfaces $r'$. These cross-pieces serve to support a conveyer-trough $r^2$, preferably of sheet-iron or steel and conforming to the tops of the cross-pieces $L^5$.

M is the conveyer-chain, to which are attached at intervals of two or three feet blocks M' for engaging the coal. The conveyer-chain is mounted upon a drum N, (see Figs. 9 to 12,) journaled at the outer end of the conveyer-frame, and a sprocket-wheel N', carried by a shaft $N^2$, journaled in slides $N^3$, which move in guides $N^4$, (see Fig. 4,) secured to the side pieces $L^2$ near their lower ends. The slides are supplied with set-screws $N^5$, by means of which the tension of the conveyer-chain is adjusted. The drum N is carried by a shaft $q$, journaled in boxes $q'$, supported by brackets $q^2$, secured to the side pieces $L^2$. At the outer end of lateral conveyer uprights $p$ are attached to the side pieces $L^2$ and support a cross-piece $p'$, supplied with brushes $p^2$, the purpose of which is to sweep the tops of the blocks M' free from particles of coal to prevent the pieces $L^4$ from being thereby cut out by a grinding action of the particles of coal which might otherwise adhere to the blocks and be carried back. Just above the shaft $q$ is pivoted a hand-lever $n$, engaging a notched guide $n'$ and connected with a rod or cable $n^2$, which communicates with the doors guarding the discharge-opening of the coal-hopper hereinbelow described.

The hopper to which the coal is conveyed from the coal-car is shown clearly in Figs. 5 and 6. P is the hopper, located above the lower end of the lateral conveyer and just back of the inclined floor F and provided at its top with trap-doors $p'$, which when thrown open form side boards which prevent the coal from scattering when dumped into the hopper. A suitable lining $p^2$, which may be of sheet-iron, protects the sides and is reflected over the tops of the timbers G and forms the side walls of the inclined chute leading to the hopper. The hopper is in the form of an inverted pyramid, the removed apex of the pyramid being replaced by a trough-shaped termination having vertically-disposed V-shaped ends $m$ and slanting sides $m'$, the latter being secured to the lower end of the truncated pyramid by means of hinges $m^2$. The hinged doors $m'$ are provided at one end with lugs $m^3$, loosely joined by a chain $m^4$. The cable $n^2$, which connects with the operating-lever at the outer end of the lateral conveyer, passes over a pulley $n^3$ upon the car-body (see Fig. 4) and is connected at its inner end to the middle of the chain $m^4$. When the lever $n$ is moved inwardly, the doors $m'$ drop open under their own weight, and when the lever is moved outwardly the doors are closed by the action of the chain $m^4$. The doors are protected against the direct action of the coal dumped into the hopper by an inverted trough-shaped baffle or deflector $m^5$ extending transversely of the hopper or in the same direction as the trough-shaped lower end thereof.

Located just back of the hopper is a vertically-disposed mast $p^3$, preferably formed of converging timbers, and pivotally connected at its base by means of hinges $l$ to the timbers G of the car-body frame, and secured in its vertical position by stay-cables $l'$, passing through rings $l^2$, secured to the car-frame.

Pivotally connected to the projecting ends of the timbers G at the front end of the car, as by pins $l^3$, is a forward-projecting boom Q of somewhat greater length than the coal-car and preferably formed of converging timbers. To these timbers near the end of the boom are fastened the ends of a cable $k$, which passes about a pulley $k'$, secured to another pulley $k^2$, upon which is the loop of a second cable $k^3$, which passes over pulleys $k^4$ upon the sides of the mast $p^3$ and has its ends secured to hooks $k^5$ at the sides of the car. By this arrangement the boom may be readily adjusted and the strain will be equalized. In this particular construction the boom is necessarily divided to permit the shovel to act.

The mast $P^3$ is provided at its top with a sheave $P^4$, about which passes a cable $P^5$, one end of which connects with a winding-drum R, Fig. 13, and the other end of which is secured to a clip $P^6$ upon the end of the boom Q. The cable $P^5$ supports a traveling shovel S. Toward its lower end the mast $P^3$ is provided with cross-bars $P^6$, which support brackets $P^7$, Fig. 4, in which is journaled a sheave $P^8$, over which passes a draw-cable $P^9$, one end of which is connected with a drum T, Fig. 13, and the other end with the shovel S. The mast $P^3$ is further provided with a bumper or trip $P^{10}$ and with a baffle-board $P^{11}$, located at the rear of the hopper and leaning against the mast, serving to protect the mast from the shovel and to prevent scattering of the coal.

The shovel S (see Figs. 2 and 8) comprises a body portion $S'$, open at the front and top and provided upon its sides toward the front end with trunnions $h$, upon which is pivoted a frame $S^2$. The frame $S^2$ comprises a forward-projecting yoke having side pieces $h'$ and a cross-piece $h^2$, upon which are supported standards or guides $h^3$ for trip-rods $h^4$, the forward ends of which are connected by a cross-bar $h^5$, Fig. 2, adjustably secured by nuts $h^6$, and it comprises, further, backward-projecting side pieces $h^7$, rear end pieces $h^8$, to which is attached the rear end sheet $h^9$, and at the top of the rear end, pieces $h^8$, forward-projecting pieces $h^{10}$, provided with pins $h^{11}$, upon which are pivoted hooked levers $h^{12}$. The hooked levers $h^{12}$ are joined by a cross-rod at $h^{13}$ and are supplied with rigidly-attached upwardly-extending arms $h^{14}$ and rigidly-attached rearwardly-extending arms $h^{15}$. Upon the sides of the scoop-body are secured hooks $h^{16}$, which engage with the hooked levers $h^{12}$. Upon the back of the shovel are rearward-extending arms $h^{17}$, the ends of which are joined to springs $h^{18}$, connected with the arms $h^{15}$. The sides of the scoop-body are provided with reinforcing-strips $h^{19}$ along the line of separation from the rear end of the shovel, and upon these strips are stops $h^{20}$, which serve to prevent the rear end of the frame $S^2$ from rocking downward when the supporting-cable $P^5$ is slack. Toward the middle of their length the side pieces are provided with uprights or standards $g$, connected at their tops by a cross-bar $g'$, Fig. 2. Toward its middle the cross-bar is provided with standards $g^2$, in which is journaled a sheave $g^3$, which moves upon the cable $P^5$. To the ends of the cross-bar $g'$ are secured forward-projecting arms $g^4$, carrying pivotally-mounted levers $g^5$, the lower ends of which are connected with the trip-rods $h^4$ and the upper ends of which are joined by links $g^6$ to the arms $h^{15}$ upon the hooked levers $h^{12}$. At its center the cross-bar $g'$ is provided with a rigidly-attached block $g^7$, which serves to prevent the cable from getting off the sheave $g^3$ should the cable be unduly slackened. The draw-cable $P^9$ is joined by chains $g^8$ to the side pieces $h'$ of the frame and by a chain $g^9$ to the block or sheath $g^7$ upon the cross-bar $g'$.

The drums R and T, Figs. 7 and 13, which operate the scoop-supporting cable $P^5$ and the draw-cable $P^9$, respectively, are themselves driven by an upright engine U. The drums are loosely mounted upon shafts journaled in suitable frames $R'$ and $T'$ upon a base $R^2$, which also serves as a base for the engine. The engine is supplied with a connecting-rod $f$, by means of which motion is communicated to a crank-shaft $f'$, supplied with a pinion $f^2$, which meshes with gear-wheels $R^3 T^3$, rigidly connected with the shafts of the drums R and T, respectively. Clutch mechanism $R^4 T^4$ of any suitable construction and provided with operating-rods $R^5 T^5$, communicating with the engineer's cab, serve to start either or both drums at the will of the operator, a continuous motion being given to the crank-shaft of the engine and to the gears $R^3$ and $T^3$. Brake-straps $f^3$, connecting with the drums, are provided with operating-rods $R^6 T^6$, leading to the engineer's cab. By means of these brakes the drums may be quickly stopped after they have been disengaged from their adjacent gear-wheels. The shaft of the drum R is rigidly connected with and virtually forms a continuation of the shaft $N^2$, upon which is keyed the sprocket-wheel $N'$, which operates the chain of the lateral conveyer.

The car is supplied at its forward end with a water-tank V and at the rear end with a boiler $V'$ and a feed-water barrel $V^2$, the latter being joined by a pipe (not shown) to the tank. The engine should be supplied with gearing (though none is shown) for propelling the car.

At its forward end the transferring-car is provided with an inclined bridge-piece W, projecting into the coal-car and suspended at its upper end by chains $e$, attached to the ends of the chute. Counterweights $W'$, secured by cords $e'$ passing over pulleys $e^2$, serve to balance the flexibly-connected bridge-piece. The purpose of this connection is of course to provide for turning curves of the track and to facilitate the adjustment of the bridge-piece.

The purpose of the various pivotal connections with the projecting parts—as of the mast $P^3$, for instance—is to permit the parts to be folded upon the car-body to facilitate transportation. It may be here stated that the purpose of the symmetrical arrangement of the platform-supporting timbers K and the ballast-supporting timbers J is to provide for the ready changing of the conveyer to the opposite side of the car should it be desired. The purpose of the extra timber J' is to better adapt the ballast-supporting timbers to receive railroad-rails as a ballast or counterweight. The timbers K are interchangeable with the timbers J. As there is a timber J' on each side, no change of this part is necessary. Supports for the conveyer are provided at both sides of the car to allow it to be readily changed.

The method of using our improved apparatus in the burning of ballast is as follows: An excavator of any approved form is placed upon a track X and supplies clay to the ballast-bank. Upon this track also are placed the coal-car to be unloaded and our improved transferring-car. The cars are stopped at short intervals along the track and the desired amount of coal unloaded and distributed upon the clay. The engineer from his cabin can see and control the operation of the shovel. When the engine is running, the crank-shaft $f'$, which is geared to the shaft $N^2$ of the lateral conveyer, runs continuously. The motion of the conveyer-chain of the lateral conveyer is therefore continuous. Suppose the shovel to have been run out to the position shown in Fig. 1 under the influence of gravity. Simultaneous slacking of the cables $P^5$ and $P^9$ allows the shovel to drop upon the coal. Pulling upon the draw-cable $P^9$ causes the shovel under its own weight to dig into the coal. When the shovel is filled, the supporting-cable is tightened somewhat, lifting the shovel and causing it under the action of the draw-cable to skim along the top of the coal till it reaches the inclined bridge-piece W, along which it is directed to the inclined chute F. The shovel continues in its course till the cross-bar $h^5$ of the trip-rods engages the bumper $P^{10}$, when through the medium of the trip-rods $h^4$, levers $g^5$, links $g^6$, and arms $h^{14}$ the hooked levers $h^{12}$ are disengaged from the hooks $h^{16}$ upon the scoop-body, permitting the latter to rotate upon the trunnions $h$ to dump the coal into the hopper P. The coal drops upon the baffle $m^5$ and thence passes through the unclosed doors $m'$ of the hopper to the lateral conveyer. Here it is engaged by the blocks M' upon the conveyer-chain and carried to the outer end of the conveyer, where it is dumped upon the platform K' to be taken by shovelers stationed there and spread as needed upon the ballast-bank. Should it happen that the coal accumulates too fast upon the platform K' to suit the shovelers, the doors $m'$ of the hopper may be closed by one of the workmen moving the hand-lever $n$ outward to draw upon the cable $n^2$, thus causing the sides of the looped chain $m^4$ to come together and force the doors shut.

The shovel may be closed before it is run out to the end of the boom by lowering it and allowing the shovel-body to rest upon the chute F, the inertia of the supporting-frame being great enough to cause the shovel-body to become locked in the closed position. In practice the shovel should be so suspended in its frame as to be incapable of rocking beyond an angle of about forty-five degrees, and to accomplish this purpose we so suspend the shovel-body as to bring its center of gravity only slightly back of the trunnions $h$ when the shovel is closed. This enables the shovel to be closed by simply lowering it upon the coal-car at any point.

As indicated above, the winding-drum R of the supporting-cable is put in operation by the lever $R^5$ and stopped by the brake-lever $R^6$ after it has been disengaged from the gear $R^3$ by the lever $R^5$. Similarly the winding-drum T of the draw-cable $P^9$ is put in operation by the lever $T^5$ and stopped by the brake-lever $T^6$.

Minor changes in details of construction may be made without departure from our invention. Hence we wish to be understood as intending no limitation by the particular description given above, except as shall appear from the appended claims.

We are aware that Patent No. 546,992 was granted to Henry G. Butler on the 24th day of September, 1895, for a distributing apparatus to be used for the purpose of unloading coal from a car and distributing it upon a ballast-bank; but experience has demonstrated that a shovel may be used to better advantage than an endless conveyer for taking the coal up out of a coal-car and transferring it to the transferring-car, and experience has also demonstrated that the work of distributing the coal upon the ballast-bank can be more effectually accomplished by shovelers stationed upon a platform to which the coal is delivered than by methods heretofore in use. We therefore consider our invention as in the nature of an improvement upon the apparatus described in said patent and confine our claims to those features which constitute said improvement.

What we claim as new, and desire to secure by Letters Patent, is—

1. In a coal unloading and distributing apparatus, the combination with the transferring-car, of transferring means operating to transfer the coal from the coal-car to the transferring-car, a lateral conveyer to receive the transferred coal, and a shoveler's platform supported by the transferring-car at some distance from one of its sides to receive the coal from said conveyer, substantially as described.

2. In unloading and distributing apparatus, the combination with the transferring-car, of a mast, a forward-projecting boom, a supporting-cable, a shovel suspended therefrom, a draw-cable attached to the shovel, and a lateral conveyer upon the transferring-car to receive the material transferred by the shovel and convey it to the place of distribution, substantially as described.

3. In a coal unloading and distributing apparatus, the combination with the transferring-car, of a mast, a forward-projecting boom, a supporting-cable attached to the boom, a shovel depending therefrom, a draw-cable attached to the shovel, a bridge-piece at the front end of the transferring-car, and a lateral conveyer for conveying the coal in a direction at right angles to the path of said shovel to the place of distribution, substantially as described.

4. In a coal unloading and distributing apparatus, the combination with the transferring-car, of a shovel operating to transfer the coal from the coal-car to the transferring-car, a flexibly-suspended bridge-piece projecting from the forward end of the transferring-car, and a lateral conveyer adapted to receive the transferred coal and convey it to the point of distribution, substantially as described.

5. In a coal unloading and distributing apparatus, the combination with the transferring-car, of a hopper, means for transferring coal from a coal-car to said hopper, a shoveler's platform supported from one side of said transferring-car, a lateral conveyer leading from discharge end of said hopper to said platform, doors guarding the discharge from said hopper, and means connected with the outer end of said lateral conveyer and with said doors for regulating their position, substantially as described.

6. In a coal unloading and distributing apparatus, the combination with the transferring-car, of a hopper, doors guarding its discharge-opening, a chain loosely joining said doors, means for transferring the coal from a coal-car to said hopper, a shoveler's platform supported from one side of said transferring-car, a lateral conveyer leading from the discharge end of said hopper to said platform, a lever at the outer end of said conveyer for regulating the position of said doors, and a cable connecting said lever with the middle part of said chain, substantially as and for the purpose set forth.

7. In a coal unloading and distributing apparatus, the combination with the transferring-car, of a mast, a forward-projecting boom, a supporting-cable attached to the outer end of said boom, a shovel suspended therefrom, a draw-cable attached to the shovel, a lateral conveyer to receive the transferred coal and convey it to the point of distribution, drums for the supporting and draw cables, and a motor connected with said drums and said lateral conveyer, substantially as and for the purpose set forth.

8. In a coal unloading and distributing apparatus, the combination with a flat-car of a frame thereon and secured thereto, a mast pivotally joined to the frame, a forward-projecting boom carried by the frame, a shoveler's platform and a lateral conveyer leading thereto, a hopper located above the lower end of said conveyer, a sheave at the upper end of said mast, a supporting-cable passing over said sheave and attached at one end to the end of said boom, a winding-drum for said cable, a shovel suspended from said cable, a draw-cable attached to said shovel, and a winding-drum for said draw-cable, substantially as and for the purpose set forth.

9. In a coal unloading and distributing apparatus, the combination with the transferring-car, of a hopper, a mast, a forward-projecting boom, a supporting-cable, a shovel suspended therefrom, a draw-cable attached to the shovel, automatic means for dumping said shovel after it reaches said hopper, and a lateral conveyer extending beneath said hopper and projecting from a side of the car, substantially as and for the purpose set forth.

10. In a coal unloading and distributing apparatus, the combination with a flat-car, of a frame mounted thereon and secured thereto, a hopper, means for transferring the coal from a coal-car to said hopper, a lateral conveyer projecting from one side of said transferring-car and pivotally joined at its lower end to the opposite side of said car, a shoveler's platform supported at one side of the car, and ballast-supporting timbers at the side of the car opposite the conveyer, said parts being interchangeable as described for changing the distribution to the opposite side of the car, substantially as and for the purpose set forth.

11. In a coal unloading and distributing apparatus, the combination with the transferring-car, and means for transferring the coal from a flat-car thereto, of a lateral conveyer comprising an open-end conveying-trough, an endless chain moving through said trough supplied at intervals with coal-engaging blocks, a guide supported from said trough along which said blocks move on the return trip, and brushes at the outer end of said conveyer for sweeping the blocks before they enter said guide, substantially as and for the purpose set forth.

ZALMON G. SIMMONS, JR.
THOMAS FORGHAM.
GEORGE M. BENNETT.

In presence of—
  BERT FOSTER,
  W. S. McDERMOTT.